US010193805B2

United States Patent
Dong

(10) Patent No.: US 10,193,805 B2
(45) Date of Patent: Jan. 29, 2019

(54) USER ORIENTED IOT DATA DISCOVERY AND RETRIEVAL IN ICN NETWORKS

(71) Applicant: Futurewei Technologies, Inc., Plano, TX (US)

(72) Inventor: Lijun Dong, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 174 days.

(21) Appl. No.: 15/259,916

(22) Filed: Sep. 8, 2016

(65) Prior Publication Data

US 2018/0069791 A1    Mar. 8, 2018

(51) Int. Cl.
*H04L 12/741*    (2013.01)
(52) U.S. Cl.
CPC ............ *H04L 45/745* (2013.01); *H04L 45/54* (2013.01)
(58) Field of Classification Search
CPC .............................. H04L 45/745; H04L 45/54
See application file for complete search history.

(56) References Cited

U.S. PATENT DOCUMENTS

| 2012/0259861 | A1* | 10/2012 | Gong | G06F 17/30094 707/741 |
| 2014/0181226 | A1* | 6/2014 | Xu | H04L 51/14 709/206 |
| 2015/0248435 | A1* | 9/2015 | Solheim | G06F 9/5072 707/610 |
| 2017/0034041 | A1* | 2/2017 | Carofiglio | H04L 45/122 |
| 2017/0302631 | A1* | 10/2017 | Wood | H04L 9/08 |
| 2017/0317885 | A1* | 11/2017 | Mahadevan | H04L 45/74 |
| 2018/0013661 | A1* | 1/2018 | Wood | H04L 45/122 |
| 2018/0041608 | A1* | 2/2018 | Wood | H04L 67/327 |

OTHER PUBLICATIONS

G. Xylomenos, C. N. Ververidis, V. A. Siris, N. Fotiou, C. Tsilopoulos, X. Vasilakos, K. V. Katsaros, and G. C. Polyzos, A Survey of Information-Centric Networking Research, IEEE Communications Surveys & Tutorials, Accepted for Publication, 2013 IEEE.
Baccelli, E., Mehlis, C., Hahm, O., Schmidt, T., and M. Wahlisch, Information Centric Networking in the IoT: Experiments with NDN in the Wild, in ACM ICN, 2014.

(Continued)

*Primary Examiner* — Chi Ho A Lee
(74) *Attorney, Agent, or Firm* — Vierra Magen Marcus LLP

(57) ABSTRACT

The disclosure relates to technology for accessing content in a network. An interest message including semantics information to be matched to the content in the network is received, and a memory is accessed to identify the content associated with the semantics information. The memory includes at least one of a content store caching the content and a forwarding information base storing routing entries. The routing entries include content names with corresponding semantics information, forwarding faces and hop count. Routing entries in the FIB having the same content name, the semantics information, forwarding faces and hop count are aggregated to form an aggregated FIB. A FIB propagation message is sent to neighboring network nodes, where the FIB propagation message includes at least changes made to the existing routing entries in the FIB.

22 Claims, 11 Drawing Sheets

(56) References Cited

OTHER PUBLICATIONS

T. Koponen, M. Chawla, B.-G. Chun, A. Ermolinskiy, K. H. Kim, S. Shenker, I. Stoica, A Data-Oriented (and beyond) Network Architecture, ACM Conference on Applications, Technologies, Architectures, and Protocols for Computer Communications (Sigcomm), Kyoto, Japan, 2007.

N. Fotiou, P. Nikander, D. Trossen, G. C. Polyzos, Developing Information Networking Further: From PSIRP to PURSUIT, International Conference on Broadband Communications, Networks, and Systems (BROADNETS), Athens, Greece, 2010. (Abstract).

N. Melazzi, S. Salsano, A. Detti, G. Tropea, L. Chiariglione, A. Di_no, A. Anadiotis, A. Mousas, I. Venieris, C. Patrikakis, Publish/Subscribe Over Information Centric Networks: A Standardized Approach in CONVERGENCE, Future Network Mobile Summit (FutureNetw), Berlin, Germany, 2012. (Abstract).

L. Zhang, D. Estrin, J. Burke, V. Jacobson and etc. Named Data Networking (NDN) Project, NDN-0001, PARC Tech Report, Oct. 30, 2010.

FP7 SAIL project. http://www.sail-project.eu/.

NDN, The Named Data Networking Project, http://www.named-data.net/.

\* cited by examiner

300

| |
|---|
| Name (optional) 302 |
| Number of Semantics Information to be Matched 304 |
| Description 306 |
| Location (tolerance level) 308 |
| Time Stamp (tolerance level) 310 |
| Size Limit (optional; tolerance level) 312 |
| (Additional Semantic Information to be Matched) 314 |

| Update | Number of Updates (N) | Update1: Content ID/Name, Description, Location, TimeStamp, HopCount | ...UpdateN |
|---|---|---|---|
| Delete | Number of Deletes (M) | Delete 1: Content ID/Name | ...DeleteM |

*FIG. 5B*

| Content ID/Name 302A | Description 306A | Location 308A | TimeStamp 310A | Face 402A | HopCount 404A |
|---|---|---|---|---|---|
| ID1 | Temperature | 92121 | 9:00 07/22/2015 | face1 | 2 |
| | | | 10:00 07/22/2015 | face1 | 2 |
| | | | 23:00 07/22/2015 | face1 | 2 |
| ID2 | Temperature | 92126 | 13:00 07/22/2015 | face5 | 4 |
| | | | 22:00 07/22/2015 | face3 | 1 |
| ID3 | Traffic video | Route 56 exit 3, San Diego | 07:00 to 07:30 07/22/2015 | face1 | 3 |
| | | | 17:00 to 16:00 07/22/2015 | face4 | 5 |

*FIG. 4A*

| Content ID/Name 302B | Description 306B | Location 308B | TimeStamp 310B | Face 402B | HopCount 404B |
|---|---|---|---|---|---|
| ID1 | temperature | 92121 | 09:00 - 23:00 07/22/2015 | face1 | 2 |
| ID2 | temperature | 92126 | 13:00 07/22/2015 | face5 | 4 |
| | | | 22:00 07/22/2015 | face3 | 1 |
| ID3 | Traffic video | Route 56 exit 3, San Diego | 07:00 to 07:30 07/22/2015 | face1 | 3 |
| | | | 17:00 to 16:00 07/22/2015 | face4 | 5 |

*FIG. 4B*

USER ORIENTED IOT DATA DISCOVERY AND RETRIEVAL IN ICN NETWORKS

BACKGROUND

In an Information-Centric Network (ICN), also referred to as a content oriented network (CON), a domain-wide unique name is assigned to each entity that is part of a content delivery framework. The entities may comprise data content, such as video clips or web pages, and/or infrastructure elements, such as routers, switches, or servers. The content router uses name prefixes, which can be full content names or proper prefixes of content names instead of network addresses, to route content packets within the content network. In the ICN, content delivery including publishing, requesting, managing (e.g., modification, deletion, etc.) may be based on content name as opposed to content location.

One aspect of the ICN that may be different from traditional Internet Protocol (IP) networks is the ability of the ICN to interconnect multiple geographical points and cache content temporarily or store content on a more persistent basis. This may allow content to be served from the network instead of an original server. Accordingly, the caching/storing may be used for real time data that is fetched by the user or for persistent data that belongs to the user or to a content provider, e.g., a third party provider. The ICN approach is being developed in several projects, such as Data-Oriented Network Architecture (DONA), Publish Subscribe Internet Technology (PURSUIT), Scalable and Adaptive Internet Solutions (SAIL), CONVERGENCE and Named Data Networking (NDN).

BRIEF SUMMARY

In one embodiment, there is a method for accessing content in a network, comprising receiving an interest message including semantics information to be matched to the content in the network; accessing a memory to identify the content associated with the semantics information, the memory including at least one of a content store (CS) caching the content and a forwarding information base (FIB) storing routing entries, the routing entries including content names with corresponding semantics information, forwarding faces and hop count; aggregating the routing entries in the FIB having the same content name, the semantics information, forwarding faces and hop count to form an aggregated FIB; and sending a FIB propagation message to neighboring network nodes, the FIB propagation message including at least changes made to the existing routing entries in the FIB.

In another embodiment, there is A node for accessing content in a network, comprising a memory storage comprising instructions; and one or more processors coupled to the memory that execute the instructions to: receive an interest message including semantics information to be matched to the content in the network; access a memory to identify the content associated with the semantics information, the memory including at least one of a content store (CS) caching the content and a forwarding information base (FIB) storing routing entries, the routing entries including content names with corresponding semantics information, forwarding faces and hop count; aggregate the routing entries in the FIB having the same content name, the semantics information, forwarding faces and hop count to form an aggregated FIB; and send a FIB propagation message to neighboring network nodes, the FIB propagation message including at least changes made to the existing routing entries in the FIB.

In still another embodiment, there is a non-transitory computer-readable medium storing computer instructions for accessing content in a network, that when executed by one or more processors, causes the one or more processors to perform the steps of: receiving an interest message including semantics information to be matched to the content in the network; accessing a memory to identify the content associated with the semantics information, the memory including at least one of a content store (CS) caching the content and a forwarding information base (FIB) storing routing entries, the routing entries including content names with corresponding semantics information, forwarding faces and hop count; aggregating the routing entries in the FIB having the same content name, the semantics information, forwarding faces and hop count to form an aggregated FIB; and sending a FIB propagation message to neighboring network nodes, the FIB propagation message including at least changes made to the existing routing entries in the FIB.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate like elements.

FIG. 3 illustrates a format of an interest message in accordance with the disclosed technology FIGS. 4A and 4B illustrate examples of a forwarding information base table in accordance with the disclosed technology.

FIGS. 5A and 5B illustrate a message flow diagram of the forwarding information base propagation and a format of the forwarding information base propagation message.

DETAILED DESCRIPTION

Figure 1:
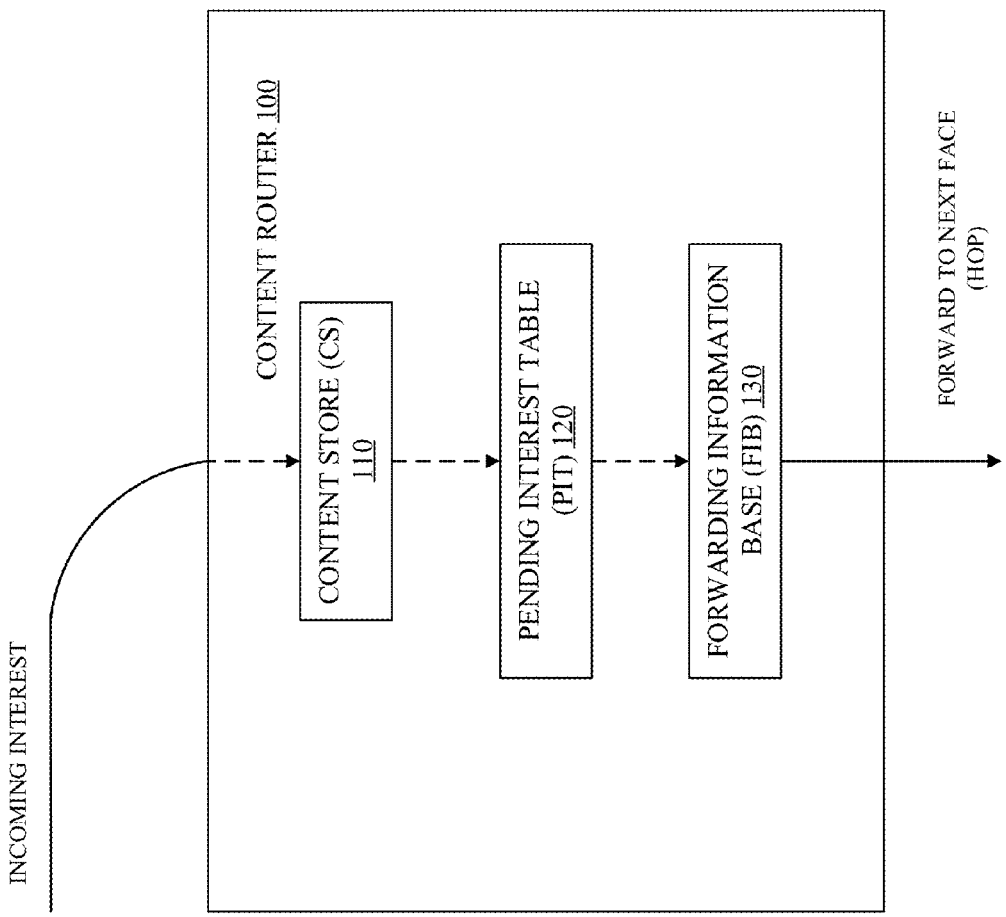
FIG. 1 illustrates an embodiment of a content router of an Information-Centric Network.

The disclosure relates to technology for discovery and retrieval of content (data) in networks, such as ICN networks. A user may wish to discover or retrieve content from the network. This is typically accomplished by the user, via a client, sending an interest message to the network, where the interest message includes the name (or identifying information) about the content. However, when the user does not have knowledge of the content name, it becomes difficult for the network to discover or retrieve the content.

In the disclosed technology, a user may request content from the network by specifying semantics information in designated fields of the interest message, without having knowledge of the content name. For example, as user may provide a description of the content, along with the location of the content in order to discover and retrieve the content from the network. Various other semantics information may also be supplied, such as time stamp or size information. The interest message may also include a tolerance level for any one or more of the semantics information that enables the network to return content that meets the semantics information, but that also deviates within the allotted tolerance level.

As the interest message is propagated to nodes in the network, the nodes are searched in local cache and FIBs for content corresponds to the requested semantics information. The FIBs are periodically updated to reflect any new content that is published to the network, such that routing entries are added, deleted and updated. In one embodiment, routing entries in the FIB may be aggregated into a single entry when various requirements are satisfied. These aggregated FIBs may also be updated to reflect the changes made to routing entries, which may then be forwarded to neighboring networking nodes using a FIB propagation message in which the changes are reported. When the semantics information in the interest message matches the semantics information in the local cache or routing entry in the FIB, the content may be returned to user.

It is understood that the present disclosure may be embodied in many different forms and should not be construed as being limited to the embodiments set forth herein. Rather, these embodiments are provided so that this disclosure will be thorough and complete and will fully convey the invention to those skilled in the art. Indeed, the disclosure is intended to cover alternatives, modifications and equivalents of these embodiments, which are included within the scope and spirit of the invention as defined by the appended claims. Furthermore, in the following detailed description of the present disclosure, numerous specific details are set forth in order to provide a thorough understanding of the present disclosure. However, it will be clear to those of ordinary skill in the art that the present disclosure may be practiced without such specific details.

Information-Centric Networking (ICN) has emerged as a promising candidate for the architecture of the future Internet, as well as the future Internet of Things (IoT). Different from conventional IP routers, ICN routers may combine content routing, content computing power, and content local cache/storage capabilities. Achieving reliable and secure content distribution may be a challenge in ICN, such as when users have some control over content distribution.

In some ICN models, such as content centric network (CCN)/named data networking (NDN) models, a content name (e.g., a prefix) may be used for content routing, which may define the content reachability to guide content retrieval from ICN routers. Internet routing protocols, such as Open Shortest Path First (OSPF) and Border Gateway Protocol (BGP), have been proposed to be extended to populate content prefix to every ICN router (e.g., within a network, domain, or group) for content routing operation.

As suggested above, ICN integrates name-based routing and in-network caching as fundamentals of the network infrastructure. There are several existing proposals for ICN, including NDN. In NDN, communications are driven by receivers, i.e. data consumers, through the exchange of two types of packets: interest packets (or messages) and data packets (or messages). In an Interest packet, a consumer places the name of a desired piece of data into the Interest packet and sends it to the network. Routers use the name to forward the Interest toward the data producer(s). In a Data packet, once the Interest reaches a node that has the requested data, the node will return the Data packet that contains both the name and the content, together with a signature by the producer's key which binds the two. The Data packet typically follows in reverse the path taken by the Interest to get back to the requesting consumer. This process is described in more detail below with reference to FIG. 1.

Within the context of IoT and ICN networks, data is typically measured in time series and therefore associated with time semantics information. Both historic and real-time data may be required by the user in many IoT use cases. Thus, the IoT data measured or recorded in time series should be considered as a series of unique data within the ICN network.

In one example, traffic monitoring may be deployed in a system in which surveillance cameras are positioned along a highway. For example, a policeman may be interested in retrieving traffic video of an accident that occurred on the highway or a driver may be interested in retrieving current traffic video on a particular freeway that she is about to travel. In this example, the video captured by the surveillance cameras has semantics information including the location of the camera, such as the specific road that a particular surveillance camera is monitoring to facilitate the discovery and usage of the data.

In another example, sensors may be deployed in a neighborhood for environmental monitoring. For example, multiple types of sensors, such as temperature sensors, humidity sensors, and air quality sensors, etc., may be deployed in a neighborhood. A person living in the neighborhood may be interested in obtaining the current temperature, humidity and air quality readings for comparison to the same type of data in the neighborhood during the same time in the previous year. In this example, the data sensed from the different types of sensors also has semantics information including the locations of the sensors, such as broadly defined semantics information (e.g., the name of the neighborhood) or more narrowly defined semantics information (e.g., the name of the road on which the sensor is located).

As described above, current ICN routers maintain content based routing tables including the unique name of content and provides in-network caching and processing of content forwarded by it, which does not require consistent connectivity for content retrieval. While this form of content based routing table may be suitable for many IoT scenarios, there are several instances in which ICN architectures do not efficiently support IoT data retrieval scenarios. These scenarios include, for example:

Any one data point in a time series is currently considered unique content in ICNs. Since users may be interested in the historic data of IoT applications, the routing table in an ICN router may not be sufficient in order to maintain the routing entries for all data points for all of the time series data.

A user may not know the exact name of the IoT data to be requested. For example, a user wants to retrieve a traffic video at 8:30 PM 07/21/2015 on Route 56 exit 3. However, the actual name of the data is unavailable or not known by the user to request such a video.

A user may be able to tolerate variances in the data being requested. Allowing for tolerance in data may also lower the cost associated with the particular request. For example, when temperature data is requested by a user at a particular time, the user may allow for a variance (tolerance) in the sensed data to be from one hour ago as opposed to current up-to-date data. Costs associated with the request may be lower since the requested data may be retrieved from a cached copy of an en-route router.

As appreciated, the examples above are non-limiting instances of IoT data. While the above examples utilize some of the more common and essential semantics information that could be used to identify IoT data, e.g. time, location and size, IoT data may be associated with many different types of semantics information.

FIG. 1 illustrates an embodiment of a content router of an Information-Centric Network. The content router 100 may collaborate for caching content with one or more other content routers (not shown) in a network, such as an ICN, which may be configured as follows. The content router 100 may comprise a content store (CS) 110, pending interest table (PIT) 120, and forwarding information base (FIB) 130. The CS 110 may be used (e.g., in a storage or memory unit) to cache (for relatively short time) or store (for relatively longer time) content data. The CS 110 may also receive and associate interests (user requests for content) with corresponding content data (requested content).

The PIT 120 may be any data structure (e.g., a table, list, or database) used to record and keep track of the received interests (requests for content) that are being served or pending (until the corresponding requested content data is received). The interests may be associated in the PIT 120 with the next hops (or next hop interfaces or faces) of the collaborative caching content router 100 on which the interests were received.

The FIB 130 may be any data structure (e.g., a table, list, or database) used to associate content with corresponding ports or faces (for next hops) on which the interests and content data are received and forwarded. The FIB 130 entries may indicate the next hops on which content (interests and data) may be forwarded. The FIB 130 may be a data structure or a sub-data structure (e.g. a data structure within a data structure, such as a table, list, or database (FIG. 2)) which may be maintained and operated (to process content interest and data) at a data plane or forwarding plane. The data plane may comprise operations for transferring content information (interest and data) in the CON, and the control plane may comprise operations related to controlling network operations including the data plane operations. The data structures above may be stored and maintained in a storage or memory unit of the content router 100.

To carry out the Interest and Data packet forwarding functions, the content router 100 (e.g., NDN router) maintains the three data structures described above, namely: (1) a CS 110 acting as a temporary cache of Data packets the router has received, which cached Data packets may be used to satisfy future Interests; (2) a PIT 120 to store all the Interests that a router has forwarded but not satisfied yet, where each PIT entry records the data name carried in the Interest, together with its incoming and outgoing interface(s); and (3) a FIB 130 as a routing table which maps name components to interfaces, and is populated by a name-prefix based routing protocol, and can have multiple output interfaces for each prefix. Additionally, the content router 100 may include forwarding policies and rules to handle forwarding of packets.

In one example embodiment, when the content router 100 receives an Interest packet (incoming interest), which includes for example the name of the content that the requester wants to request, the content router 100 first checks to determine if there is a locally cached copy of the content in the CS 110. If a locally cached copy of the content exists in the CS 110, the content router 100 can reply to the Interest by sending the content copy to the incoming face of the Interest.

If no locally cached copy of the content exists, the content router 100 checks to determine if there are pending interests in the PIT 120 with the same content name. If the same Interest exists and is pending, then the incoming face of the new Interest is added to the list of faces for the content name in the PIT 120. Accordingly, the new interest is no longer required to be forwarded.

Otherwise, the content router 100 forwards the Interest by performing a lookup, such as a longest-match lookup, in the FIB 130 based on the content name. The Interest is then stored in the PIT 120. If no matched entry is maintained in the FIB 130, then the Interest is forwarded to the faces other than the incoming face.

Figure 2:
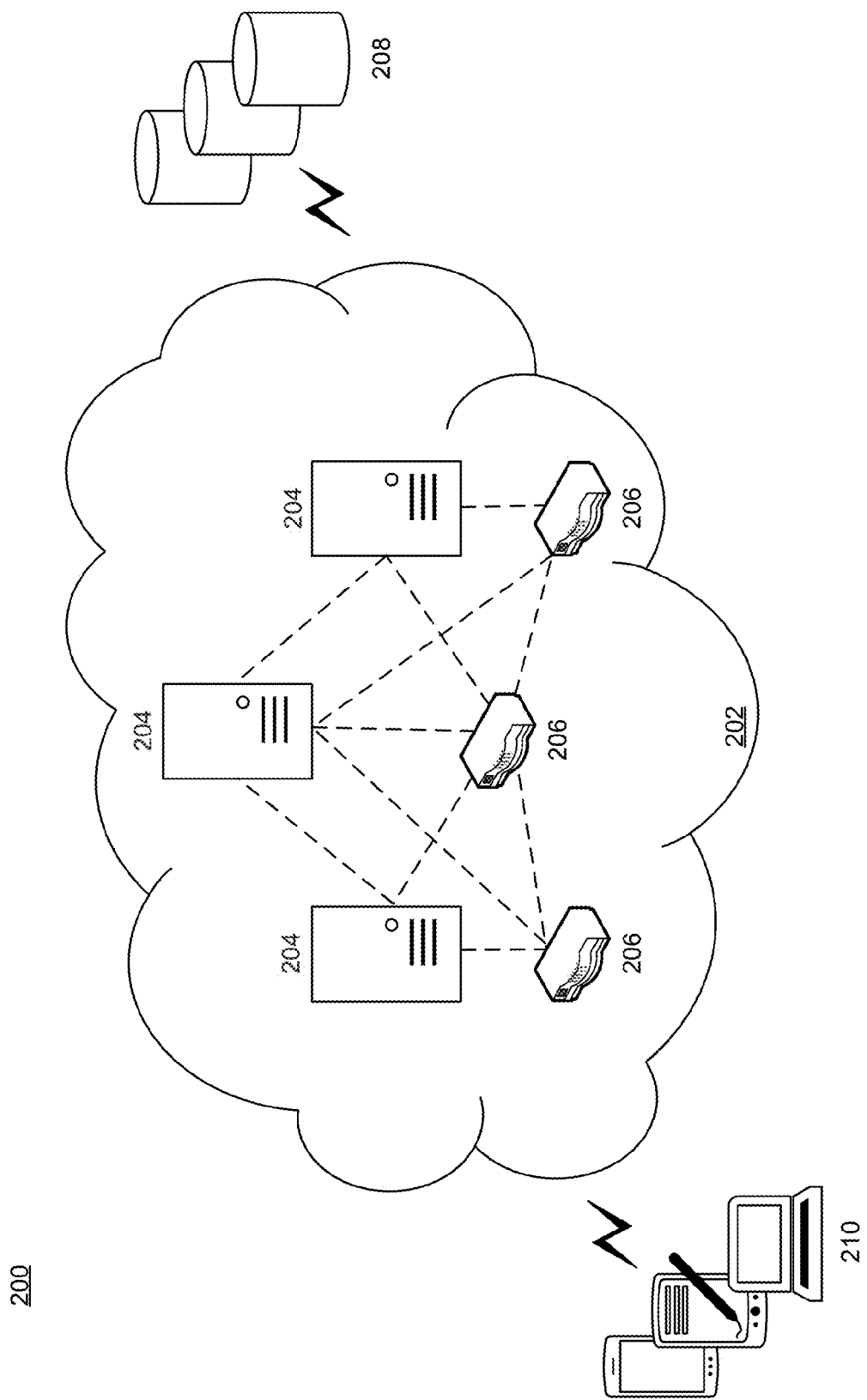
FIG. 2 illustrates a network architecture to provide content as requested by different users in an information centric network.

FIG. 2 illustrates a network architecture to provide content as requested by different users in an information centric network. The network environment 200 may include the ICN 202 having controllers, such as ICN managers 204. The ICN managers 204 may be, for example, a network entity that may have control over a set of network resources in a data plane. In one embodiment, the ICN managers 204 maintain a synchronized record of content hosted by different network entities in the ICN 202. For example, the ICN functionalities may include ICN name resolution, routing, and management. The ICN managers 204 may be deployed in a distributed or in a centralized or in a hybrid manner depending upon the Internet Service Providers (ISP).

ICN 202 may also include routers 206, which may include storage to cache content as it propagates through the ICN 202. The routers 206 may also be communicatively coupled with the ICN managers 204 and may be configured to process requests received from users for accessing the content via user devices 210, such as a mobile device or computer.

The network environment 200 may further include stores 208, which may store the content or collections of content, such as files, images, videos, and the like. Accordingly, the ICN managers 204 and the ICN routers 206 may communicate with the data stores 208 to provide the content to different users. Additionally, the network environment 200 may include one or more user devices 210, including for example and without limitation, desktop computers, handheld devices, laptops or other portable computers, network computers, mobile phones, landline phones, and the like.

In one embodiment, a request may be a request based on a name of the content. That is, if a user of user device 210 knows the name of the data (such as IoT data) being requested, then a conventional interest message (as described above) may be used with the content name being specified. In this context, the user device 210 may send a request through the TCP for accessing the content to the ICN 202. In the ICN 202, the request may be received by the ICN router 206 connected to the user devices 210. The ICN router 206 may forward the request received from the user device 210 to the ICN manager 204 associated therewith. Additionally, the ICN manager 204 may determine one or more network entities (not shown) that may be hosting the requested content.

In one embodiment, the ICN manager 204 may determine the network entity based on a name of the content as requested by the user device 210. As mentioned above, the ICN manager 204 maintains a record of the content being hosted by different network entities, the ICN manager 204 may compare the name of the content with each of the network entities to identify the network entity hosting the requested content.

In an example, the ICN manager 204 may communicate with neighboring ICN managers 204, such as through peer-to-peer connection, to determine the network entity hosting the requested content. The search for the requested content is performed between the ICN managers 204 until the requested content is located.

Once the network entity is identified, the ICN manager 204 may send a notification to the identified network entity to provide the requested content to the user device 210. In one example, the ICN manager 204 may share an Internet Protocol (IP) address of the user device 210 with the identified network entity for providing the requested content directly to the user device 210. In one example embodiment, the requested content may be stored at the data store 208 or at the ICN router 206. In another example embodiment, part of the requested content may be stored at the data store 208 and remaining part of the requested content may be stored at a cache of the ICN router 206.

In another embodiment, the ICN manager 204 may determine the network entity without referencing the name of the content as requested by the user device 210. For example, instead of supplying the name of the content, user devices 210 may provide various semantics information to be matched against data stored in the ICN 202. For example, a user of user devices 210 may request data based on one or more of location, time stamp and size limit of the content. To implement such a request, an interest message should be configured to understand and interpret the semantics information. Such an interest message and the procedures for implementing a request using such an interest message are described herein below beginning with FIG. 3.

FIG. 3 illustrates a format of an interest message in accordance with the disclosed technology. In particular, the depicted interest message 300 permits discovery and retrieval of IoT data without knowing the name of the content (e.g., the content ID/Name). For example, IoT data discovery and retrieval can performed simultaneously when an IoT data request message, as shown in FIG. 3, is processed by each router 106, such as the NDN router in FIG. 2. The interest message 300 includes the following non-limiting fields: Name 302, Number of Semantics Information to be Matched 304, Description 306, Location 308, Time Stamp 310, Size Limit 312 and Additional Semantic Information to be Matched 314.

The Description field 306 is used to describe the data in a short summary, e.g. traffic video, temperature data, etc. If the Name field 302 is not specified in the interest message 300, the Description field 306 should be populated.

Unlike a user requesting data in a conventional interest message, if the user does not know the name of the IoT data (content) being requested, the name field 302 of the interest message 300 may be left blank. That is, the name field 302 is optional in interest message 300. Instead (or complimentary to), a user may specify semantics information to be matched with the requested IoT data for discovery and/or retrieval. Accordingly, the Number of Semantics Information to be Matched field 304 enables a user to indicate the amount (number) of semantics information to be satisfied (matched) by the returned IoT data.

For example, the Description field 306, Location field 308, Time Stamp field 310 and Size Limit field 312 are types of semantics information commonly identified in a user's request for IoT data. Following the traffic example above, a user's request such as a traffic video at 8:30 PM 07/21/2015 on Route 56 Exit 3 can be formulated with three sets (number) of semantics information to be matched, i.e. the Description field 306 is set to traffic video, the Location field 308 is set to Router 56 Exit 3 and the Time Stamp field 310 is set to 8:30 PM 07/21/2015.

The Location field 308 is used to designate the location semantics information. The location semantics information provides where a particular device, such as a surveillance camera or temperature sensor, generated the content. The location could be a physical address, geolocation, latitude/longitude, a thing that the physical device is attached to (e.g., road, person, window, light, etc.). If the Name field 302 is not specified in the interest message, the Location field 308 should be populated. Additionally, the Location field 308 may be set based on various tolerance levels, as described below.

The Time Stamp 310 field is used to designate a time or time period when the content was stamped or generated. Similar to the fields above, if the Name field 302 is not specified in the interest message, the Time Stamp field 310 should also be populated. In one embodiment, the default value of the Time Stamp field 310 is set to be "up-to-date," thereby permitting the most recent content to be returned. Additionally, the Time Stamp field 310 may be set based on various tolerance levels, as described below.

The Size Limit field 312 is used to designate the lower limit (or any other limit) of the content size that the user requires to be satisfied. For example, the user may require that the traffic video size cannot be smaller than 100 M to thereby ensure a particular video resolution (since higher resolution requires a larger size of data). In one embodiment, the Size Limit field 312 is optional.

The interest message 300 may also include an additional semantics information field 314 that may use other semantics information that is not depicted as a specific field in the interest message 300. Such additional semantics information field 314 may also be used for matching to the requested content.

As indicted above, various fields in the interest message 300 may also include a tolerance level. For example, in the interest message 300 of FIG. 3, the Location field 308, Time Stamp field 310, and Size Limit field 312 semantics information may include tolerance levels. As defined herein, a tolerance level is an amount of variation or deviation that a user is willing to accept from the requested content compared to the actual retrieved content. In exchange for providing a tolerance level, the user should benefit from some cost savings and/or reduction is network resource usage.

For example, assume an ICN charging model, in which a user is charged by the number of ICN routers 106 forwarding the interest message 300 until matching content is returned, as well as the bandwidth used in transporting the content back to the user. If a tolerance level is provided, as opposed to requesting an exact match, content from a router in the network closer to the user may be sufficient compared to more exact content residing on a router further from the user. As a result, a user could be charged less for the content with a variance (based on the tolerance) since the interest message is being forwarded less (does not need to travel as far to reach the further router).

In the ICN charging model example, suppose the tolerance level of the Location field 308 is the physical distance between the required location and the location where the returned data was generated, which can be represented in various units/formats (miles, number of exists, etc.); the tolerance level of the Time Stamp field 310 could be the time difference between the required time stamp and the time stamp of the returned data, which can be represented in seconds, minutes, hours, and days; and the tolerance level of the Size Limit field 312 could be the size difference between the required lower bound of the size and the size of the returned data, which can be represented in bytes. Setting the tolerance levels in this manner allows the system to return the content with some degree of variation or deviation. That is, rather than searching each entry for content that exactly matches the requested content, a range of entries may be searched to identify the requested content. Accordingly, the system will not take as long as it would to generate an exact match since fewer entries require searching (e.g., an exact match requires searching every entry, whereas allowing for a degree of variance (tolerance) allows a range of entries to be searched at once), and the number of ICN routers forwarding the interest message would be less, thereby reducing overall costs.

FIGS. 4A and 4B illustrate examples of a forwarding information base table in accordance with the disclosed technology. The FIB depicted in FIG. 4A is stored on a router 106, such as an NDN router, and maintains semantics information similar to those described in the interest message illustrated in FIG. 3. In the FIB of FIG. 4A, the fields include, but are not limited to, content ID/Name 302A, Description 306A, Location 308A, Time Stamp 310A, Face 402A and Hop Count 404A.

In one embodiment, in order to prevent the FIB from being overloaded, content with the same Description 306A and Location 308A (i.e., the same IoT application in the same location), are stored as a single entry with the same content ID/Name 302A. Organizing the content in this manner is possible since the data generated by a producer is recorded in time series and only differs in time semantics information (i.e., the Time Stamp 210A data is different, but the Description 306A and Location 308A are the same).

For example, a temperature sensor (producer ID1) at location A records the temperature (content) over time (in time series). Thus, the first content ID/Name 302A (ID1) entry includes content having the same Description 306A and Location 308A semantics information, but is generated at different times (i.e., different Time Stamp 310A semantics information). Similarly, the second and third content ID/Name 302A (ID2 and ID3, respectively) include content, having the same Description 306A and Location 308A semantics information, but are generated at different times (i.e., different Time Stamp 310A semantics information). Thus, the entries in the FIB of FIG. 4A for data in time series (both current and historic data) can be aggregated into a single content ID/Name entry (when Face 402A and Hop Count 404A are also the same for each entry), as described below with reference to FIG. 4B.

FIG. 4B illustrates a FIB after aggregation of the content stored in the FIB of FIG. 4A. In one non-limiting embodiment, the router 106 executes a FIB Entry Aggregation Function, which aggregates the routing entries that share fields having the same Content ID/Name 302B, Description 306B, Location 308B, Face 402B and Hop Count 404C. That is, the FIB entry Aggregation Function may be implemented as entries in the FIB satisfy the shared field requirements. Alternatively, the FIB entry Aggregation Function may be implemented periodically. Within this context, the Time Stamp 310A (FIG. 4A) can be aggregated and replaced by a superset of the existing Time Stamp 310B (FIG. 4B) values. For example, the three Time Stamp 310A entries (9:00 07/22/2015, 10:00 07/22/2015 and 23:00 07/22/2015) in the FIB of FIG. 4A are aggregated into a single Time Stamp 310B entry (9:00-23:00 07/22/2015) in the FIB of FIG. 4B. Aggregating the data in this manner eliminates multiple entries of data be replacing the multiple entries with the superset of data. Accordingly, more storage space is available in the FIB and less entries are searched when discovering and retrieving content.

More specifically, and continuing with the above example, the three entries of content included in the Content ID/Name 302B (ID1) column are associated with the same forwarding face 402B, i.e. face1. The FIB Entry Aggregation Function of the router 106 can therefore deduce that the content (provided in Description 306B), such as temperature data collected from temperature sensors, within the same Location 308B (e.g., zip code 92121), in the entries each face toward face1 and aggregate the Time Stamp 310B of the ID1 entry to the superset of the existing Time Stamp 310B values.

For the Content ID/Name 302B entries ID2 and ID3 of the FIB in FIG. 4B, the entries cannot be aggregated by the router 106 since the forwarding faces 402B are different for each of the IoT data (e.g., Time Stamp 310B entries).

Figure 5A:
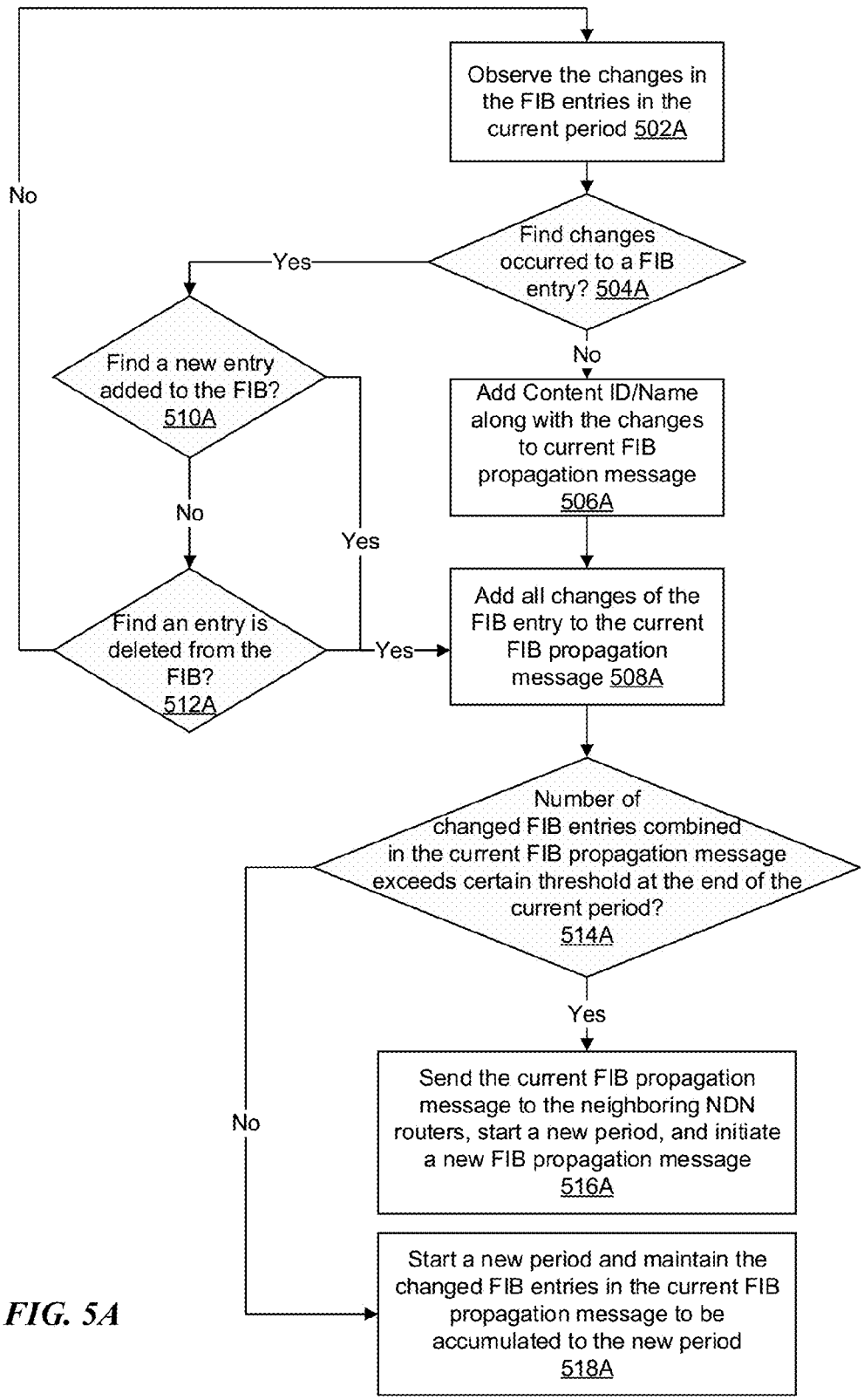

FIGS. 5A and 5B illustrate a message flow diagram of the forwarding information base propagation and a format of the forwarding information base propagation message. With respect to FIG. 5A, the described procedure may be implemented using one or more of routers 106. However, it is appreciated that implementation of such procedures is not limited to router 106 and that any component communicatively coupled to the network may be responsible for implementation.

As well understood by the skilled artisan, an NDN router 106 propagates FIB entries to neighboring network nodes (routers) periodically. That is, the FIB 130 is used to forward data packets to neighboring routers. When a data packet is received on a routed interface, the NDN router 106 looks up the destination in the FIB 130 to find the next hop router for the data packet to be forwarded. In order to limit the size and number of FIB propagation messages 500B (FIG. 5B), the NDN router 106 counts the number of FIB entries (at the end of each period) that have changed during the current period. For example, the Description field 306A, Location field 308A, Time Stamp field 310A, Face field 402A and/or Hop Count field 404A may change during any period. These changes count towards the number of FIB entries that have changed in the period. In one embodiment, if the number of changes exceeds a threshold, then the NDN router 106 may only include the changed entries in the FIB propagation message 500B.

At 502A, an NDN router 106 via the FIB Propagation and Inquiry Function observes any changes occurring in the routing entries of the FIB during the current period. Specifically, the NDN router 106 monitors the FIB to determine whether any field in an existing (current) routing entry of the FIB has changed, any new entry has been added in the FIB and/or any existing entry has been deleted from the FIB.

The FIB Propagation and Inquiry Function maintains statistics on the fields and values contained in a received interest message. If a particular field and value combination appear a certain (i.e., frequent) number of times, the FIB Propagation and Inquiry Function may decide to broadcast a FIB inquiry message (not shown) to the neighboring NDN routers 106. A FIB inquiry message includes the identified field (semantics information) and associated value combinations that have been frequently received but cannot be forwarded by the NDN router 106 due to a lack of routing information stored in the FIB.

When a neighboring NDN router 106 receives the FIB inquiry message, the neighboring NDN router 106 attempts to match entries in the FIB inquiry message with the existing FIB entries stored locally. If there is a successful match (i.e., the FIB inquiry message matches (matching need not be exact when a tolerance level exists) an existing entry in the FIB stored locally), the routing information is replied to the requesting NDN router 106. If the match is unsuccessful, the NDN router 106 may disregard the inquiry message or record the inquiry message as a pending query, which may be sent to the next hop neighboring NDN router 106.

At 504A, the NDN router 106 determines whether changes have occurred to an existing routing entry in the FIB. As an example, consider the following FIB including: (1) the Description field 306B filled with a value, (2) the Location field 308B updated due to the movement of the content producer (e.g., sensor), (3) the Time Stamp field 310B updated due to the aggregation of the new value to the existing values or added as a result of new content recorded in time series being published, and (4) the Face 402B and Hop Count 404B changed due to the content producer's mobility (e.g., sensor movable) or added because new content recorded in time series is published from a new producer (e.g., a new sensor is added to the network). In this case, only the Hop Count 404B value is notified to the neighboring NDN routers 106, where the Hop Count 404B value is increased by 1 to reflect the hop between the current NDN router 106 and its neighboring router. The Face 402B value, on the other hand, can be stored locally on the NDN router 106.

Any changes made to an existing FIB entry, as described above, are added to the current FIB propagation message 500B. As disclosed in FIG. 5B, the FIB propagation message 500 is formatted to incorporate changes to a routing entry in the FIB using an update category and/or a delete category. For example, and with reference to the FIB propagation message 500B of FIG. 5B, the update category may provide the number of updates (N) along with any changes to the semantics information. If there is a single update, the number of updates N=1 and a single update ("Update 1") with corresponding updated semantics information (e.g., updates to any one or more of Content ID/Name, Description, Location, Time Stamp, Hop Count) is provided in the FIB propagation message 500B.

At 510A, if the NDN router 106 determines that a new entry has been added to the FIB during the current period, the entire entry is added to the FIB propagation message 500B in the update category at 508A. That is, all of the semantics information is updated in the FIB propagation message 500B since the entry is new.

If a new entry has not been added to the FIB at 510A, and the NDN router 106 determines that an entry has been deleted from the FIB at 512A, the Content ID/Name 302B is added to the FIB propagation message 500B in the delete category at 508A. As shown in FIG. 5B, the FIB propagation message 500B includes the number of deletes (M) and a single delete ("Delete 1") with the corresponding Content ID/Name 302B.

At 514A, the NDN router 106 counts the number of changes (including updates and deletes) at the end of the current period to determine if the total number of changes exceeds a threshold to trigger propagation of the FIB propagation message 500B. The threshold may be predetermined or learned by machine learning.

If it is determined by the NDN router 106 that the threshold has been exceeded at 514A, the current FIB propagation message 500B is sent to the neighboring NDN routers 106 and a new period begins with a new and empty FIB propagation message 500B at 516A. If the NDN router 106 determines that the threshold has not been exceeded at 514A, a new period is started and the changed routing entries in the FIB of the current FIB propagation message 500B are copied to a new FIB propagation message 500B for use in the newly started period at 518A.

During propagation of the FIB propagation message 500B, each NDN router 106 receiving the FIB propagation message 500B processes the update and delete categories contained in the message. For each of the N number of updates, if the Content ID/Name 302B already exists in the FIB, then neighboring NDN routers 106 update the corresponding fields (updated semantics information) contained in the FIB propagation message 500B. Various other non-limiting scenarios also exist:

- If the Time Stamp field 310B is the sole update, which indicates that new data in time series has been published from the same producer (e.g., same sensor), then the Time Stamp field 310B in the local FIB entry is replaced with the superset of the time stamps in the local entry, including the sole update.
- If the Hop Count field 404B is the sole update, then the NDN router 106 evaluates whether the Face 402B and Hop Count fields 404B in the local FIB entry should be updated. If the current Hop Count 404B value is larger than the Hop Count value in the update, then the Face 402B is changed to the face connecting the current NDN router 106 and the sending NDN router 106 of the FIB propagation message 500B. The Hop Count 404B value is also changed to the updated value. Otherwise, no change is made to the FIB.
- If both Time Stamp field 310B and Hop Count field 404B (and thus a different face) are included in the update, then new data in time series has been published from a new (or different) producer. In this case, the Time Stamp 310B value is added to a new sub-entry under the same content ID/Name 302B. The Face field 402B is set to the face connecting the current NDN router 106 and the sending NDN router 106 of the FIB propagation message 500B, and the Hop Count 404B value is set to the update in the message.

Returning to the NDN router 106 observing changes in FIB entries at 502A (which changes may be observed as content arrives or periodically by the NDN router), if the NDN router 106 does not find any changes in a routing entry of the FIB, then the Content ID/Name 302B does not exist in the FIB of the NDN router 106, and the update is considered to be entirely new content. Accordingly, the new content is added as a new routing entry to the FIB at 506A, along with any changes in the current FIB propagation message 500B. If the FIB propagation message 500B includes any deletes, neighboring NDN routers (such as NDN routers) 106 delete entries with the Content ID/Name 302B contained in the delete category.

The following examples are illustrative of the FIB propagation and inquiry function. It is appreciated that the examples are non-limiting.

Example 1

The Name field exists in the IoT data interest message. In this example, a user has knowledge of the IoT data name (i.e., content ID/Name field 302B). In one embodiment, the name may be provisioned or obtained through a name resolution service.

If the Time Stamp field 310B is not contained in the interest message or a tolerance level is not specified, then the user is requesting data within a specific time or time frame (e.g., the most up-to-date content). If a cached copy is stored in the local CS, then the content may be returned to the user via the incoming face of the interest message. Otherwise, content is not immediately returned.

If the Time Stamp field 310B (and the corresponding tolerance level) are included in the interest message, then the requested content may deviate or vary from the requested time based on the tolerance level. For example, a user may specify a time with a tolerance of plus/minus 24 hours. If, on the other hand, an exact match is located in the local CS, the cached copy may be returned through the incoming face of the interest message. Otherwise, the NDN router 106 may return a cached copy of the content that satisfies the tolerance level.

In one embodiment, the returned data may include the time semantics information. That is, the time semantics information may be piggybacked on the return message such that the user may become aware of the time period in which the data was retrieved. For example, if the returned data does not exactly match the original request, but a tolerance level was included in the request, the returned data will notify the user of the time period from which the data was retrieved and/or acknowledge it falls within the tolerance level.

If the local CS does not cache any content satisfying any of the above conditions, then the FIB is used to forward the interest message. In this example, an entry in the FIB should satisfy the following requirements:
 1) Content ID/Name is the same; and
 2) If the Time Stamp field exists in the interest message, the absolute value of the difference between the Time Stamp in the interest message and the time semantics information of the cached copy is smaller than the tolerance level of the Time Stamp field.

The entry with the least amount of time difference, but within the provided tolerance level, is used to forward the interest message to the next hop router 106 (i.e., the router identified in the FIB to forward the interest message). If there is no such entry satisfying the above conditions 1) and 2), then the interest message is recorded (i.e., stored) by the NDN router 106 to later decide whether a FIB inquiry message should be sent to the neighboring routers 106.

Example 2

The Name field does not exist in the content interest message. If the Content ID/Name 302B field does not exist in the interest message, the NDN router 106 may use the semantics information included in the interest message to discover and retrieve the best match. The NDN router 106 first searches for a match in the local CS. If no match exists, then the FIB is used to forward the request/message, as described below. To forward the request, the Description field 306B and Location field 308B are used in the interest message when the Content ID/Name field 302B does not exist.

More specifically, the NDN router 106 searches the local CS to find a matching copy. The matching copy should satisfy the following requirements:
 1) The Description field 306B is the same;
 2) The distance between the Location field 308B in the interest message (denoted by $loc_{interest}$) and the location semantics information of the cached copy (denoted by $loc_{cached}$) is shorter than the tolerance level of the Location field (denoted by $tl_{location}$), i.e. distance($loc_{interest}$, $loc_{cached}$)<$tl_{location}$; and
 3) If the Time Stamp field 310B exists in the interest message, the absolute value of the difference between the Time Stamp in the interest message (denoted by $t_{interest}$) and the time semantics information of the cached copy (denoted by $t_{cached}$) is smaller than the tolerance level of the Time Stamp field (denoted by $tl_{time}$), i.e. $|t_{interest} - t_{cached}| < tl_{time}$.

The locally cached data with the smallest weighted index is returned. The weighted index is calculated as:

$$\alpha * \text{distance}(loc_{interest}, loc_{cached}) + \beta * |t_{interest} - t_{cached}| \qquad (1)$$

where $\alpha$ and $\beta$ are coefficients in front of the location and time stamp deviation to reflect the weight of the two factors.

If a matching copy is cached in the local CS, then the data is returned through the incoming interface to the user. As described above, the semantics information may also be piggybacked on the returned data.

If a matching copy is not cached in the local CS that satisfies the above requirements, then the FIB is used to forward the request. An entry in the FIB should satisfy the following requirements:
 1) The Description field 306B is the same;
 2) The distance between the Location field 308B in the interest message (denoted by $loc_{interest}$) and the location semantics information of the cached copy (denoted by $loc_{entry}$) is shorter than the tolerance level of the Location field (denoted by $tl_{location}$), i.e. distance($loc_{interest}$, $loc_{entry}$)<$tl_{location}$; and
 3) If the Time Stamp field 310B exists in the interest message, the absolute value of the difference between the Time Stamp in the interest message (denoted by $t_{interest}$) and the time semantics information of the cached copy (denoted by $t_{entry}$) is smaller than the tolerance level of the Time Stamp field (denoted by $tl_{time}$), i.e. $|t_{interest} - t_{entry}| < tl_{time}$.

The weight index is calculated similar to Equation (1):

$$\alpha * \text{distance}(loc_{interest}, loc_{entry}) + \beta * |t_{interest} - t_{entry}| \qquad (2)$$

where $\alpha$ and $\beta$ are coefficients in front of the location and time stamp deviation to reflect the weight of the two factors.

The entry with the least weighted index, but within the tolerance level, is used to forward the interest message to the next hop router 106. If no entry satisfies the above conditions 1), 2) and 3), then the interest message is recorded by the NDN router 106 to decide whether an FIB inquiry is should be sent to the neighboring routers 106.

Figure 5C:
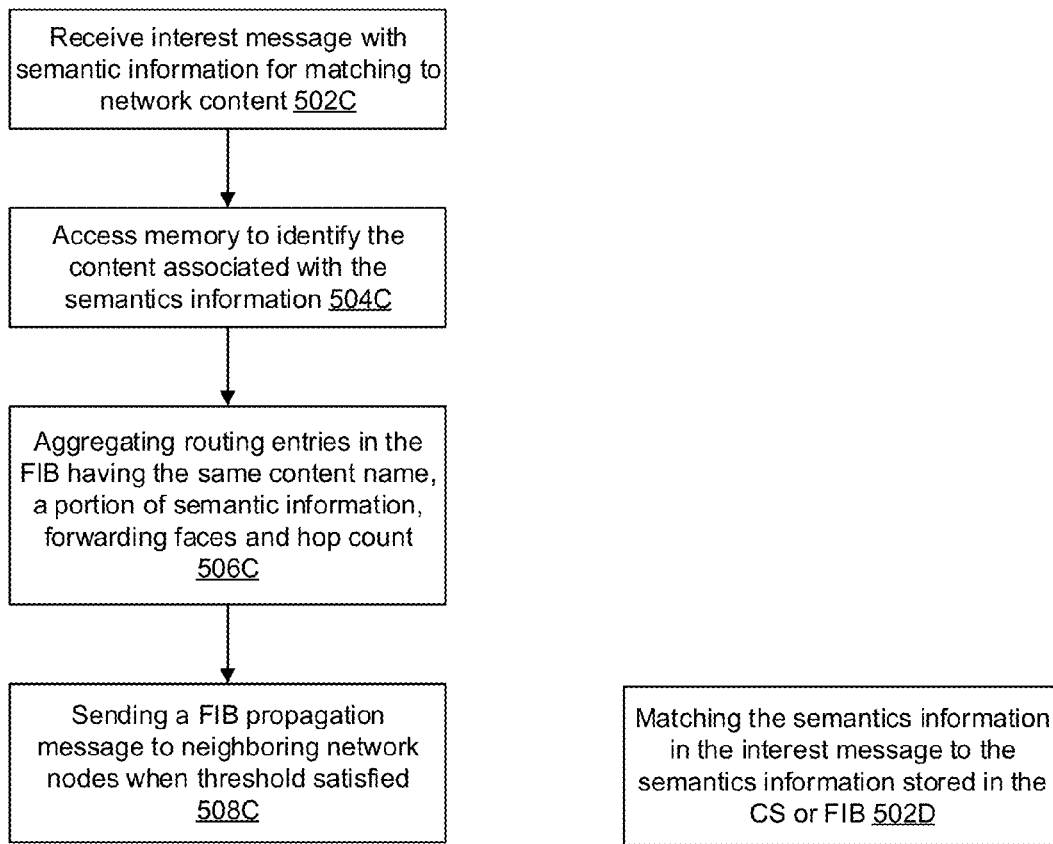
FIG. 5C illustrates a flow diagram for processing a data request in accordance with the disclosed technology.

FIG. 5C illustrates a flow diagram for processing a data request in accordance with the disclosed technology. The procedures described herein are implemented by a router 106, such as an NDN router, although it is appreciated that any component communicatively coupled to the network may implement such procedures.

When an NDN router 106 receives an interest message for data (such as IoT data) retrieval and discovery, the interest message may be processed according the flow diagram of FIG. 5C.

At 502C, the NDN router 106 receives an interest message including semantics information for matching to content in the network.

At 504C, the NDN router 106 accesses its memory to identify content associated with the semantics information that is stored locally in the CS or in the FIB. The memory includes, for example, one or more CSs caching content and a FIB storing routing entries. The routing entries in the FIB typically include content names 302B with corresponding semantics information (e.g., Description 306B, Location 308B, Time Stamp 310B etc.), forwarding faces 402B and hop count 404B.

The NDN router 106 identifies routing entries stored in the FIB that have the same content name as the content name in the interest message, at least a portion of the semantics information is the same, and the forwarding faces and hop count are the same at 506C. At 508C, a FIB propagation message is sent to neighboring network nodes, where the FIB propagation message includes changes made to the routing entries of the FIB. In one embodiment, the propagation message is sent upon satisfying a predetermined threshold. For example, the threshold is set such that propagation messages are sent to optimize use of system resources.

Figure 5D:
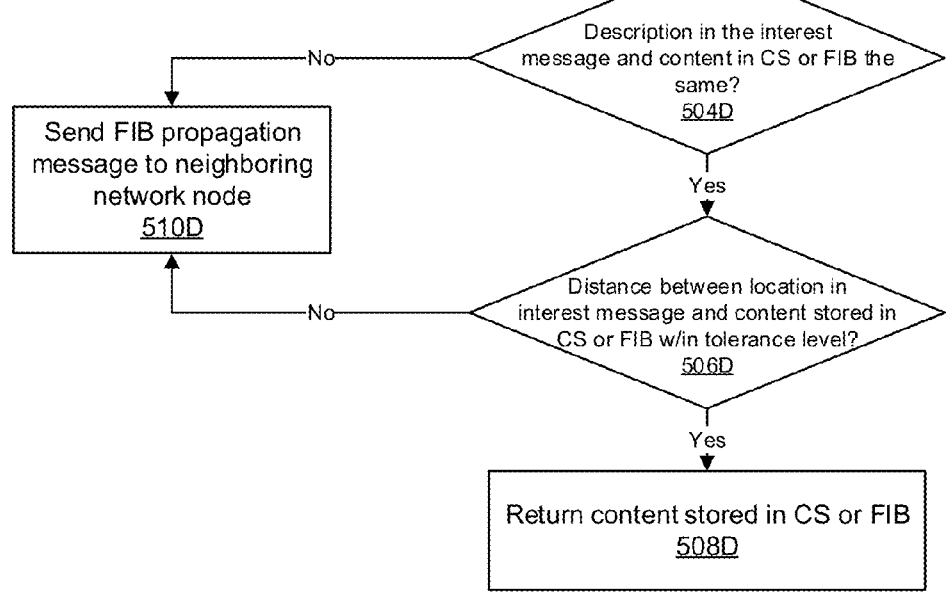
FIG. 5D illustrates an example flow diagram of matching semantics information in accordance with the disclosed technology.

FIG. 5D illustrates an example flow diagram of matching semantics information in accordance with the disclosed technology. The procedures described herein are implemented by a router 106, such as an NDN router, although it is appreciated that any component communicatively coupled to the network may implement such procedures.

At 502D, the NDN router 106 attempts to match the semantics information in the interest message to the semantics information of the content cached in the CS or in the FIB. In order for a match to occur, the matching the semantics information should include the description in the interest message and the description in the content stored in one of the CS and FIB are the same (504D), and a distance between the location in the interest message and the location of the content stored in one of the CS and FIB is less than a tolerance level defined for the location in the interest message (506D). If both requirements are met, then a match is found and the content stored in one of the CS and FIB may be returned to a sender of the interest message (e.g., client 210) at 508D. Otherwise, if either requirement is not satisfied, then a FIB propagation message is forwarded to neighboring network nodes at 510D.

Figure 6A:
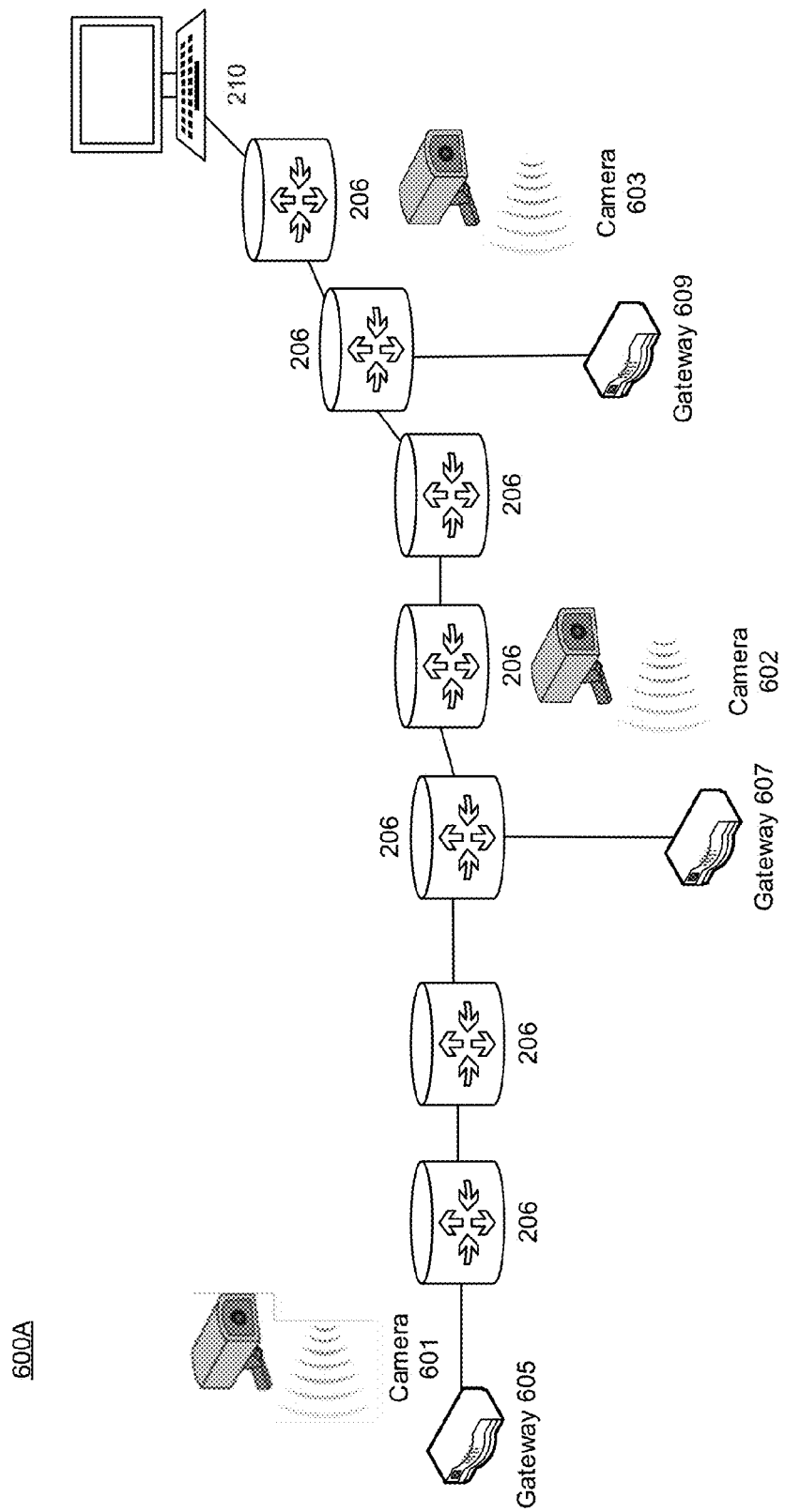
FIG. 6A illustrates an example network topology in accordance with the disclosed technology.

FIG. 6A illustrates an example network topology in accordance with the disclosed technology. The network topology 600A includes, but is not limited to, cameras 601, 602, 603, gateways 605, 607, 609, routers 206 and client 210. With reference to the network topology 600A, an example of traffic monitoring to discover and retrieve IoT data in an ICN network is discussed.

In the disclosed example, the three cameras 601, 602 and 603, such as traffic cameras, are deployed and attached to respective gateways 605, 607 and 609. In this example, content produced by the traffic cameras 601, 602, 603 is generated with the same Description field 302A, such as "traffic video," and is associated with semantics information, such as Location field 306A, Time Stamp field 310A and Size (not shown).

The content captured by the cameras 601, 602 and 603, along with the semantics information, is published to the network. As a result, the FIB maintained in each of the NDN routers 106 is populated with routing entries for the content (in this case, traffic video) generated by each camera 601, 602 and 603.

A client 210, attached to one of the NDN routers 106, may want to request the content generated by the cameras 601, 602 and 603, but may not know the name of the content being requested. Using the procedures disclosed herein, the client 210 may request the Location, Time Stamp and Size in an interest message to obtain the content, without having any knowledge of the content name.

In the following analysis, the client 210 is attached to the rightmost NDN router 106 (nearest the client 210) and the requested content is being retrieved from the leftmost camera 601 (the original producer). Thus, the largest number of hops that the interest message may be forwarded is the number of hops between the client 210 and Gateway 601 (i.e., 8 hops). However, any one of the other, en-route NDN routers 206 may have a cached copy that satisfies the client's 210 content request. The en-route NDN routes 206 may alternatively forward the interest message to a nearby producer (e.g., Gateway 602, Gateway 603). Thus, depending on which routers 206 or gateways 602, 603 have a copy of the requested content, the interest message may only require forwarding 1 to 7 hops.

The equations that follow define calculations to determine how many hops an interest message will be forwarded. Specifically, equation (3) defines the probability that an NDN router 206 has cached content satisfying that the Location, Time Stamp and Size are within the corresponding tolerance level specified by the client 210 (i.e., the probability that an NDN router has matching data). Equation (4) defines the probability that a nearby producer (e.g., Gateway 602, 603) can provide the requested data satisfying that the Location, Time Stamp and Size are within the corresponding tolerance level specified by the client 210.

$$P_{CS}=p_{cached}*p(\text{diff}_{loc}<tl_{loc})*p(\text{diff}_{time}<tl_{time})*p(\text{diff}_{size}<tl_{size}) \quad (3)$$

$$P_s=p(\text{diff}_{loc}<tl_{loc})*p(\text{diff}_{time}<tl_{time})*p(\text{diff}_{size}<tl_{size}) \quad (4)$$

Equations (5) to (12) below define the probability that the interest message is forwarded 1-8 hops (e.g., p(1) is one hop, p(2) is two hops . . . p(8) is eight hops). Since two other produces (gateways 602 and 603) exist in addition to gateway 601, the calculations of p(3) and p(6) (equations (7) and (10) below) should consider the following two scenarios: (1) the NDN router 206 at the second hop forwards the interest message to Gateway 603, and (2) the NDN router 106 at the second hop forwards the interest message to the neighboring NDN router 106 at the third hop.

$$p(1)=P_{CS} \quad (5)$$

$$p(2)=P_{CS}*(1-p(1)) \quad (6)$$

$$p(3)=(1-\Sigma_{k=1}^{2}p(k))*(P_s+P_{CS}*(1-P_s)) \quad (7)$$

$$p(4)=P_{CS}*(1-\Sigma_{k=1}^{3}p(k)) \quad (8)$$

$$p(5)=P_{CS}*(1-\Sigma_{k=1}^{4}p(k)) \quad (9)$$

$$p(6)=(1-\Sigma_{k=1}^{5}p(k))*(P_s+P_{CS}*(1-P_s)) \quad (10)$$

$$p(7)=P_{CS}*(1-\Sigma_{k=1}^{6}p(k)) \quad (11)$$

$$p(8)=1-\Sigma_{k=1}^{7}p(k) \quad (12)$$

The average number of hops that the interest message traverses in the network is calculated as shown in equation (13), and the average cost that is saved for a user is calculated in equation (14). In equation (14), costPerHop defines the cost introduced to a user each time an interest message is forwarded by a NDN router. The cost reduction ration is set forth in equation (15), where a total of 8 hops is possible.

$$\text{hop} = \Sigma_{i=1}^{8} p(i)*i \qquad (13)$$

$$\text{savedCost} = \text{costPerHop}*(8-\text{hop}) \qquad (14)$$

$$\text{costReductionRatio} = (8-\text{hop})/8 \qquad (15)$$

These savings are illustrated with reference to FIGS. 6B and 6C below.

Figure 6B:
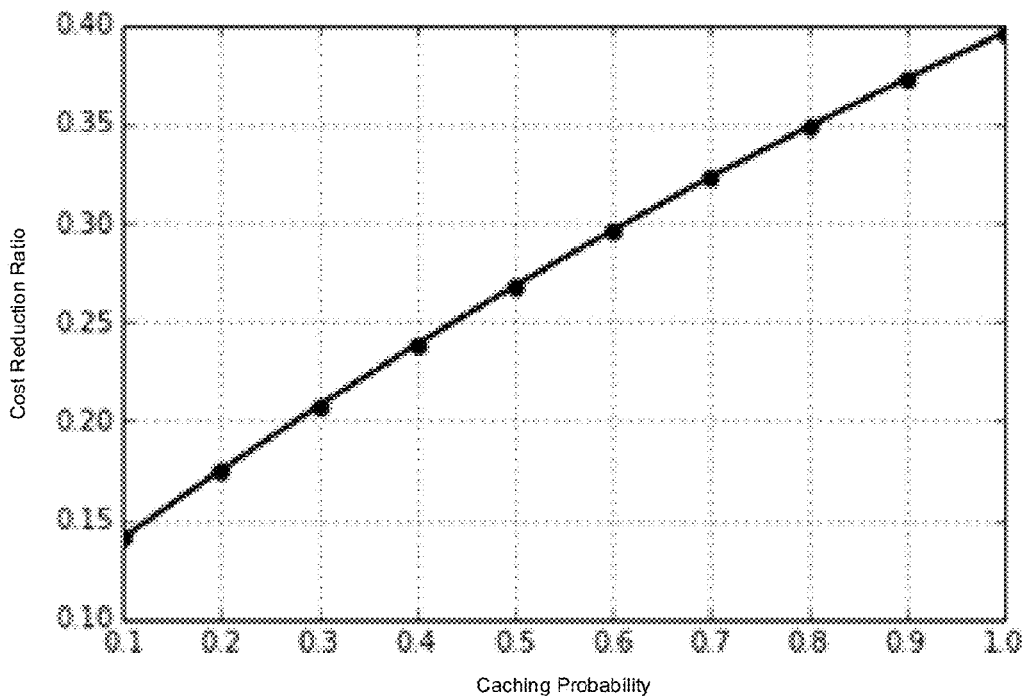
FIG. 6B illustrates the cost reduction ratio versus a caching probability at a router.

FIG. 6B illustrates the cost reduction ratio versus the caching probability ($p_{cached}$) at each router. In the example, it is assumed that $p(\text{diff}_{loc} < tl_{loc})*p(\text{diff}_{time} < tl_{time})*p(\text{diff}_{size} < tl_{size}) = 0.5*0.5*0.5 = 0.125$. That is, the probability that a cached copy stored in a NDN router 106, or IoT data provided by Gateway 602 and Gateway 603 matches the interest message is 0.125. As the probability of an existing cached copy increases, the cost reduction ratio increases from 15% to 40%, as illustrated.

Figure 6C:
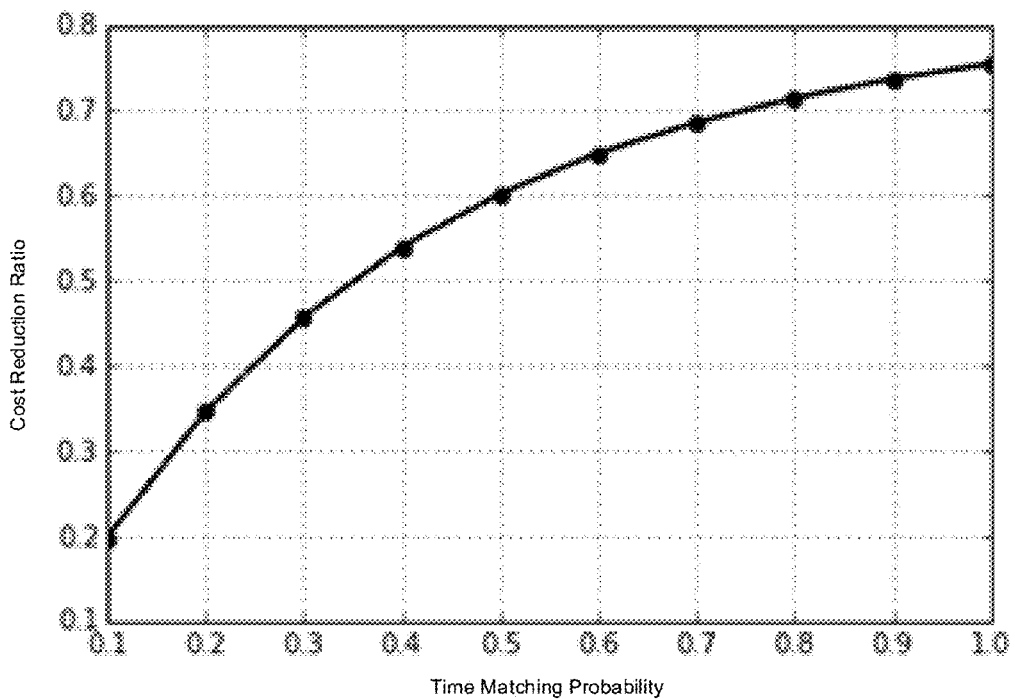
FIG. 6C shows the impact of a time matching probability on the cost reduction ratio.

FIG. 6C shows the impact of time matching probability (i.e. $p(\text{diff}_{time} < tl_{time})$) on the cost reduction ratio. In the example, the caching probability is set to 0.4, the probability of location and size matching is 1. As illustrated, the cost reduction ratio is substantial at 20% even with the time matching probability being 10%. When the client loses the time matching requirement, the cost reduction ratio can reach as high as 70%.

Extending the example of FIG. 6A from one of traffic monitoring to any data retrieval in any IoT application in a network topology 600A, it is assumed that there are n total number of hops between the client 210 and the original IoT data provider (e.g., camera 601). The n total number of hops is also the maximum number of hops that the interest message would traverse in the network topology 600A, given the proper routing information maintained by en-route NDN routers 206.

There are two scenarios in which an interest message request will result in a reply by router 206: (1) An NDN router 206 has a cached copy of content that matches the semantics information in the interest message, and the corresponding tolerance level specified in the interest message it satisfied; and (2) Another IoT data provider, such as a neighboring NDN router 206, provides the same type of IoT data, and also matches the semantics information in the interest message and the corresponding tolerance level specified in the interest message.

In the equations the follow, $p_i$ denotes the probability that the interest message will result in a reply by a node (e.g., router) in the network topology, where the node is indexed by i. Additionally, $q_j$ denotes the probability that the request cannot be satisfied from a node j hops away from the client 210. It then follows:

$$q_j = \Pi_{\text{node } i \text{ is } j \text{ hops away}}(1-p_i) \qquad (16)$$

Let $h_j$ denote the probability that the request cannot be satisfied by any node up to (inclusive) j hops away (it is assumed that the client does not have the data), then it follows:

$$h_0 = 1 \qquad (17)$$

$$h_j = h_{j-1} q_j \qquad (18)$$

Let $r_j$ denote the probability that the request is satisfied by a node j hops away, then it follows:

$$r_j = h_{j-1}(1-q_1) \qquad (19)$$

The average number of hops that an interest message is forwarded in the network topology is therefore calculated as:

$$\text{hop} = \Sigma_{j=1}^{n} = r_j * j \qquad (20)$$

Equation (20) can be used to estimate the delay experienced and the cost paid by the client 210. A lower number of the hop results in either the IoT data retrieval latency or the cost to the client being reduced.

Figure 7:
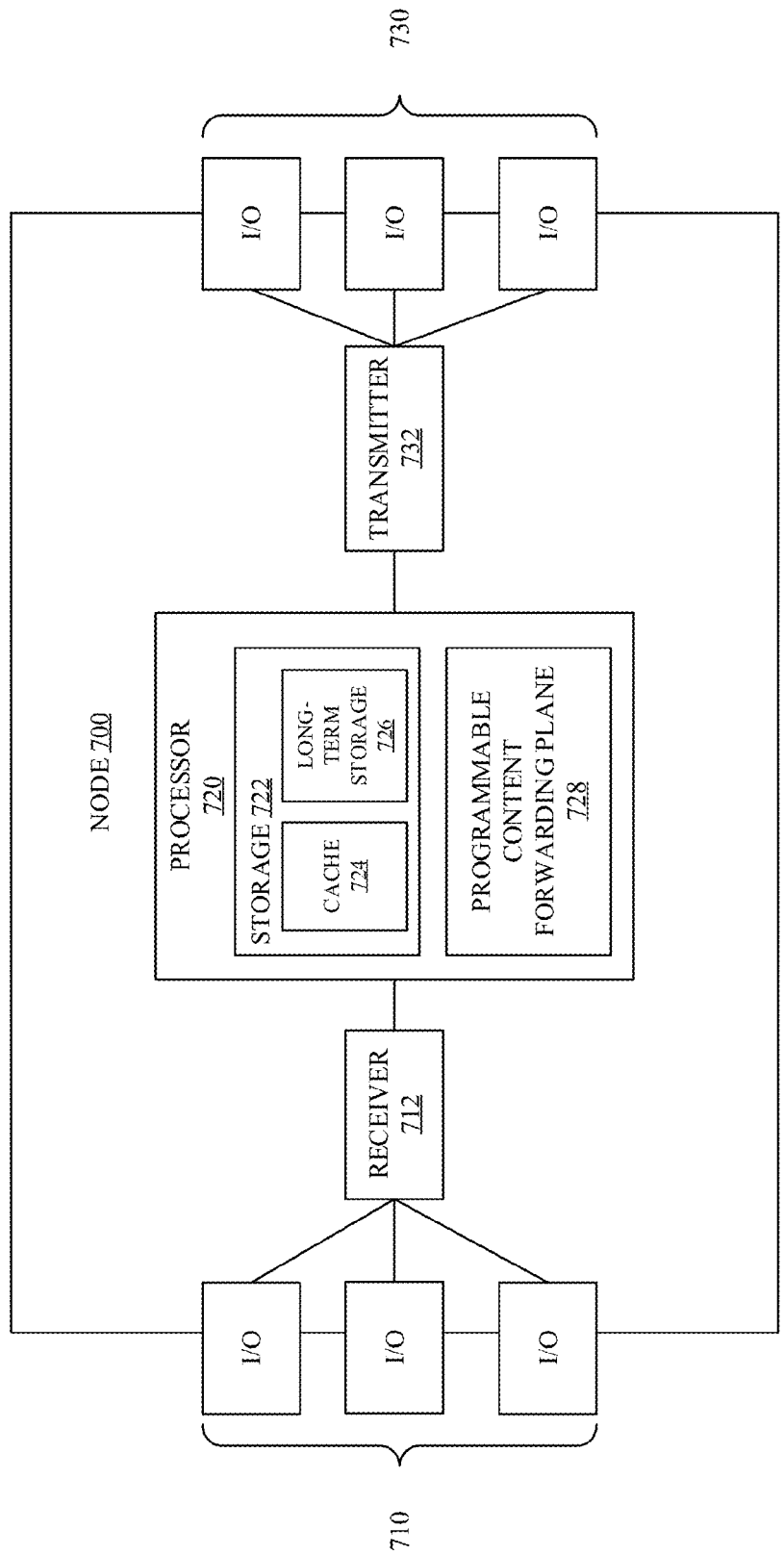
FIG. 7 illustrates an embodiment of a router in accordance with embodiments of FIGS. 2 and 6A.

FIG. 7 illustrates an embodiment of a router in accordance with embodiments of the disclosure. The node (e.g., a router) 700 may be, for example, the content router 100 (FIG. 1) or any other node or router as described above in the ICN. The node 700 may comprise a plurality of input/output ports 710/730 and/or receivers (Rx) 712 and transmitters (Tx) 732 for receiving and transmitting data from other nodes, a processor 720 (or content aware unit), including a storage 722 and programmable content forwarding plane 728, to process data and determine which node to send the data. The node 700 may also receive Interest messages and Data messages as described above. Although illustrated as a single processor, the processor 720 is not so limited and may comprise multiple processors. The processor 720 may be implemented as one or more central processing unit (CPU) chips, cores (e.g., a multi-core processor), field-programmable gate arrays (FPGAs), application specific integrated circuits (ASICs), and/or digital signal processors (DSPs), and/or may be part of one or more ASICs. The processor 720 may be configured to implement any of the schemes described herein, such as the processes illustrated in FIGS. 3-6, using any one or combination of steps described in the embodiments. Moreover, the processor 720 may be implemented using hardware, software, or both.

The storage 722 (or memory) may include cache 724 and long-term storage 726, and may be configured to store routing tables, forwarding tables, or other tables or information disclosed herein. Although illustrated as a single storage, storage 722 may be implemented as a combination of read only memory (ROM), random access memory (RAM), or secondary storage (e.g., one or more disk drives or tape drives used for non-volatile storage of data).

The programmable content forwarding plane 728 may be configured to implement content forwarding and processing functions, such as at an application layer or L3, where the content may be forwarded based on content name or prefix and possibly other content related information that maps the content to network traffic. Such mapping information may be maintained in one or more content tables (e.g., CS, PIT, FIB) at the processor 720. The programmable content forwarding plane 728 may interpret user requests for content and accordingly fetch content, e.g., based on meta-data and/or content name (prefix), from the network or other content routers and may store the content, e.g., temporarily, in storage 722. The programmable content forwarding plane 728 may then forward the cached content to the user. The programmable content forwarding plane 728 may be implemented using software, hardware, or both and may operate above the IP layer or L2.

Figure 8:
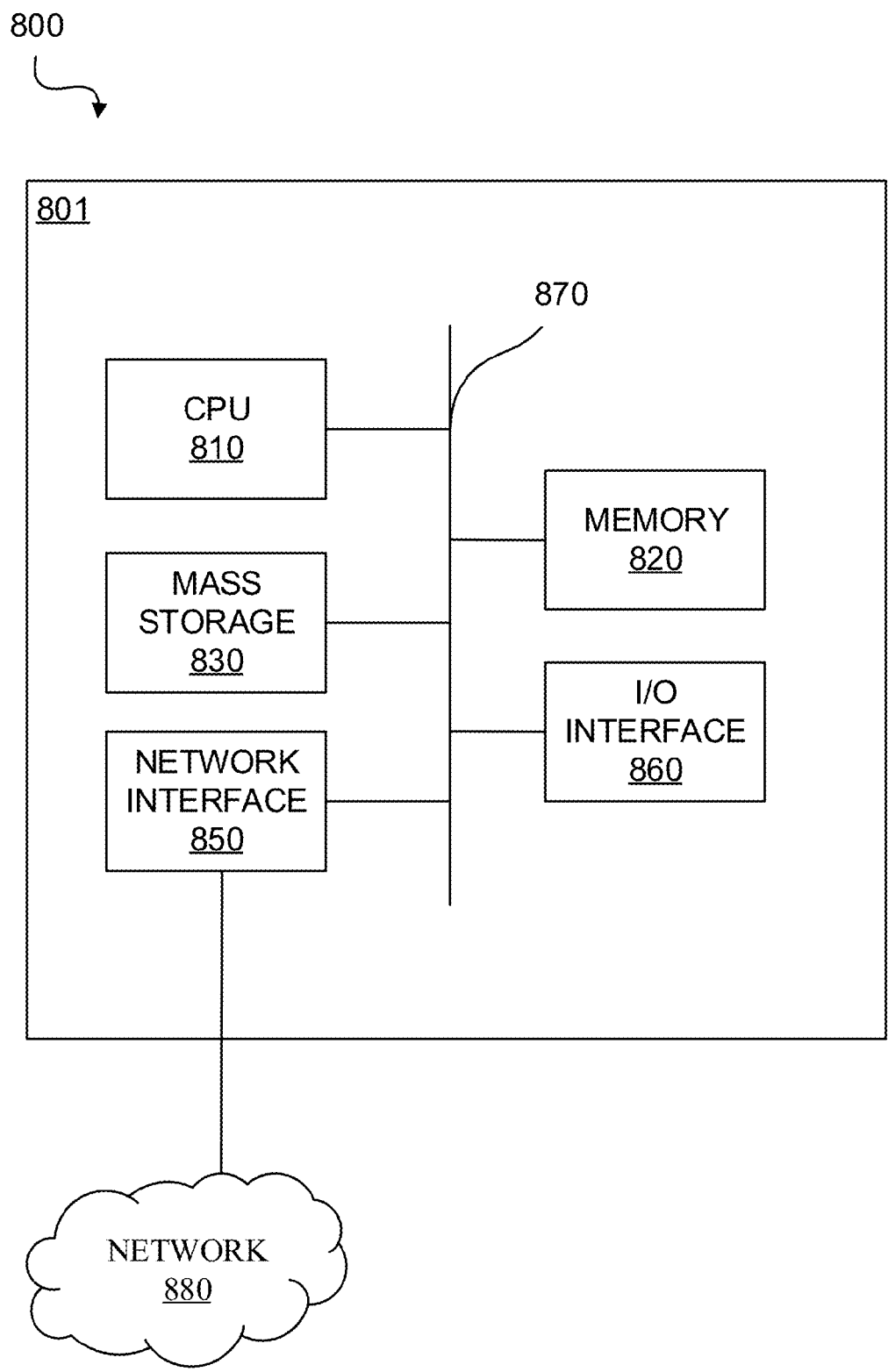
FIG. 8 illustrates a block diagram of a network system that can be used to implement various embodiments.

FIG. 8 is a block diagram of a network system that can be used to implement various embodiments. Specific devices may utilize all of the components shown, or only a subset of the components, and levels of integration may vary from device to device. Furthermore, a device may contain multiple instances of a component, such as multiple processing units, processors, memories, transmitters, receivers, etc. The network system may comprise a processing unit 801 equipped with one or more input/output devices, such as network interfaces, storage interfaces, and the like. The processing unit 801 may include a central processing unit (CPU) 810, a memory 820, a mass storage device 830, and an I/O interface 860 connected to a bus. The bus may be one or more of any type of several bus architectures including a memory bus or memory controller, a peripheral bus or the like.

The CPU 810 may comprise any type of electronic data processor. The memory 820 may comprise any type of system memory such as static random access memory (SRAM), dynamic random access memory (DRAM), synchronous DRAM (SDRAM), read-only memory (ROM), a combination thereof, or the like. In an embodiment, the memory 820 may include ROM for use at boot-up, and DRAM for program and data storage for use while executing programs. In embodiments, the memory 820 is non-transitory. The mass storage device 830 may comprise any type of storage device configured to store data, programs, and other information and to make the data, programs, and other information accessible via the bus. The mass storage device 830 may comprise, for example, one or more of a solid state drive, hard disk drive, a magnetic disk drive, an optical disk drive, or the like.

The processing unit 801 also includes one or more network interfaces 850, which may comprise wired links, such as an Ethernet cable or the like, and/or wireless links to access nodes or one or more networks 880. The network interface 850 allows the processing unit 801 to communicate with remote units via the networks 880. For example, the network interface 850 may provide wireless communication via one or more transmitters/transmit antennas and one or more receivers/receive antennas. In an embodiment, the processing unit 801 is coupled to a local-area network or a wide-area network for data processing and communications with remote devices, such as other processing units, the Internet, remote storage facilities, or the like.

Figure 9:
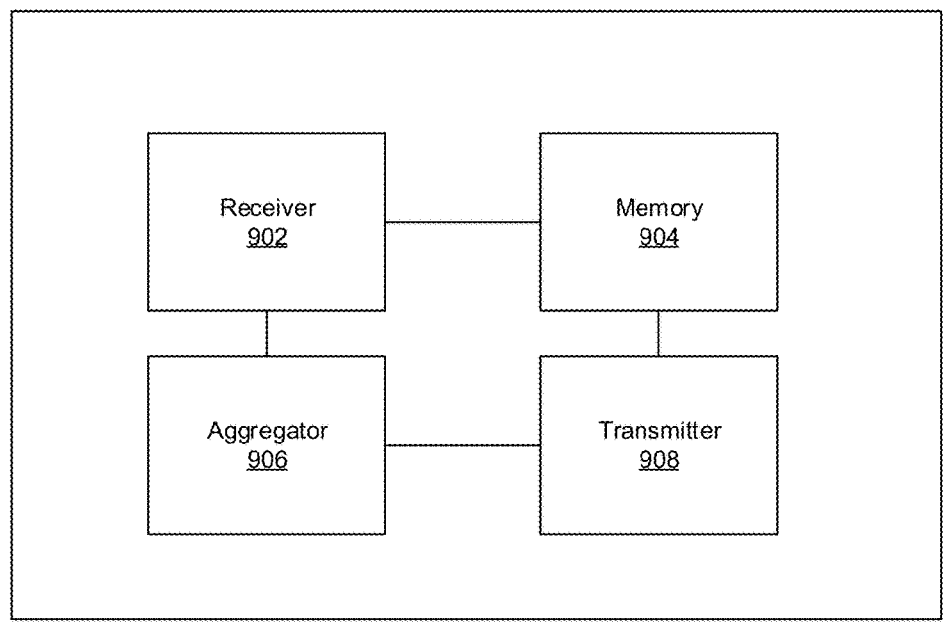
FIG. 9 illustrates a module to access content in a network.

FIG. 9 illustrates a module to access content in a network. The module includes, for example, a receiver 902, a memory 904, an aggregator 906 and a transmitter 908. The receiver receives an interest message including semantics information to be matched to the content in the network. The memory 904 is accessed to identify the content associated with the semantics information, where the memory includes a content store (CS) caching the content and a forwarding information base (FIB) storing routing entries. The routing entries include, in one embodiment, content names with corresponding semantics information, forwarding faces and hop count. The aggregator 906 routes entries in the FIB having the same content name, the semantics information, forwarding faces and hop count to form an aggregated FIB. The transmitter 908 sends a FIB propagation message to neighboring network nodes, where the FIB propagation message includes updates and deletes (changes) made to the existing routing entries in the FIB.

Figure 10:
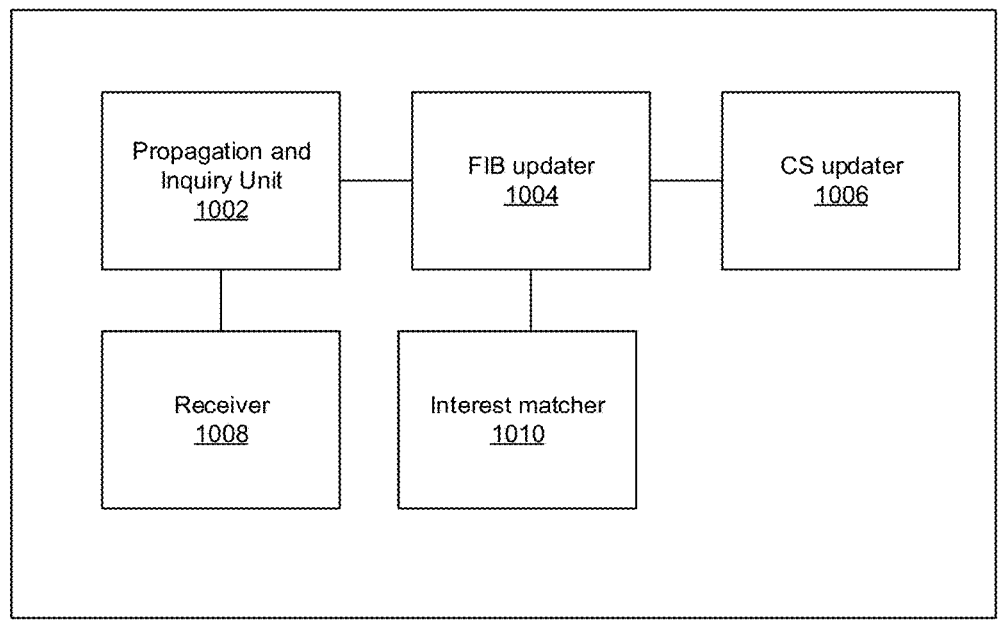
FIG. 10 illustrates a network entity in accordance with the disclosed technology.

FIG. 10 illustrates a network entity in accordance with the disclosed technology. The network entity includes, for example, a propagation and inquiry unit 1002, FIB updater 1004, CS updater 1006, receiver 1008 and interest matcher 1010. The propagation and inquiry unit 1002 is responsible for observing changes (e.g., additions and deletions) in the FIB entries during a current period. The FIB updater 1004 adds and removes entries into the FIB based on the received messages. Similarly, CS updater 1006 is responsible for updating content in the local cache or memory of the network entity. Receiver 1008 receives the incoming messages propagated from neighboring nodes, and the interest matcher 1010 matches content requests with the content stored in the FIB and/or local memory or cache of the network entity.

In accordance with the embodiments, a mechanism is provided to support context awareness for content request in ICN architectures by: leveraging and building on the ICN architecture and fundamental design principles with minimum change to the protocols; routers can learn the context information of content and its producers without extra overhead; and routers are able to associate contextual information to forwarding faces for future content requests. Accordingly, the system significantly decreases the network bandwidth on transporting the content that cannot satisfy client's requirements, routers can make the correct decision in choosing the forwarding face towards the content that meets the client's contextual requirements, which reduces the content request failures and routers do not need to multicast the interest message to all forwarding faces if they exist, which reduces the network bandwidth in transporting it as well as control states maintained by each involved router.

As a result of the context-aware content mechanisms discussed above, several advantages are provided including, but not limited to (1) context awareness from client's side using the interest message format with optional contextual requirements represented in conditions, where the condition is represented by context name, operator and context value; (2) supports the context awareness from router's side by processing an Interest message with contextual requirements from a client, deciding on the forwarding face by matching the contextual requirement to the context information of the faces, aggregating pending interests by the overlapping of contextual requirements, and processing a data message, associating the context information learned from the corresponding pending interest or piggybacked from the producer; and (3) supports the context awareness from content producer's side by processing an Interest message with contextual requirements, and piggybacking relevant context information of the requested content in the data message.

Additionally, the mechanisms disclosed above provide mechanisms to support semantics based and in-network data discovery and routing for content request in ICN architectures. The mechanisms leverage and build on the ICN architecture and fundamental design principles with minimum change to the protocols, routers are able to associate and aggregate semantics information to forwarding faces for future content requests, and clients have the flexibility in specifying whether they want to sacrifice some accuracy of the returned data for less cost.

Accordingly, routers can make the correct decision in choosing the forwarding face towards the content that meets the client's semantics requirements and optionally the tolerance levels, which reduces the network bandwidth usage and client's cost. Clients do not need to perform the separate data discovery and retrieval procedures, which largely improves the client's user experience with less complex process and shorter latency.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for accessing content in a network, comprising:
   receiving an interest message including semantics information to be matched to the content in the network, the semantics information excluding a name of the content;
   accessing a memory to identify the content requested in the interest message using the semantics information, the memory including at least one of a content store (CS) caching the content and a forwarding information base (FIB) storing routing entries, the routing entries including content names with corresponding semantics information, forwarding faces and hop count;
   aggregating the routing entries in the FIB having the same content name, the semantics information, forwarding faces and hop count to form an aggregated FIB; and
   sending a FIB propagation message to neighboring network nodes, the FIB propagation message including at least changes made to the existing routing entries in the FIB.

2. The method of claim 1, further comprising:
   monitoring the routing entries in the FIB for changes during a current period;
   in response to identifying the changes to the existing routing entries of the FIB, determining whether a routing entry has been added to the FIB;
   adding the routing entry to the FIB propagation message in the current period in response to determining the routing entry has been changed or added to the FIB;
   in response to determining no routing entry has been added to the FIB, determining whether any of the existing routing entries has been deleted from the FIB; and
   adding the deleted routing entry to the FIB propagation message in the current period in response to determining that one or more of the existing routing entries has been deleted from the FIB.

3. The method of claim 2, further comprising:
   adding a new routing entry into the FIB, including at least a new content name and changes to the FIB propagation message in the current period, in response to no changes being identified in the routing entries of the FIB in the current period; and
   adding the new routing entry to the routing entries of the FIB to the FIB propagation message in the current period.

4. The method of claim 2, further comprising:
   determining whether a total number of changes to the routing entries in the FIB propagation message in the current period exceeds the predetermined threshold;
   sending the FIB propagation message in the current period to the neighboring network nodes in response to determining that the total number has exceeded the predetermined threshold; and
   starting a new period and maintaining the FIB propagation message from the current period, including the added and deleted routing entries, in response to determining that the total number has not exceeded the predetermined threshold.

5. The method of claim 4, wherein in response to determining that the total number has exceeded the predetermined threshold, starting a new period and initiating a new FIB propagation message for the new period.

6. The method of claim 1, wherein the FIB propagation message includes
   an update category indicating a number of updates made to the FIB and a corresponding content name, semantics information and hop count for each of the number of updates, and
   a delete category indicating a number of deletes and a corresponding content name for each of the number of deletes.

7. The method of claim 1, wherein the semantics information includes a description of the content and a location of the content.

8. The method of claim 7, wherein
the semantics information further includes a time stamp indicating a time period when the content was generated, and
the timestamp for the aggregated FIB comprises a superset of the time period for each of the routing entries in the FIB having the same content name.

9. The method of claim 7, further comprising:
matching the semantics information in the interest message to the semantics information of the content stored in one of the CS and the FIB, wherein the matching the semantics information satisfies:
the description in the interest message and the description in the content stored in one of the CS and FIB are the same, and
a distance between the location in the interest message and the location of the content stored in one of the CS and FIB is less than a tolerance level defined for the location in the interest message; and
returning the content stored in the CS or using the entry in the FIB towards a producer of the content requested in the interest message in response to finding matching semantics information.

10. The method of claim 9, wherein the matching the semantics information further satisfies that an absolute value of a difference between a time period in the interest message and a time period in the content stored in one of the CS and FIB is less than a tolerance level defined for a time stamp in the interest message.

11. A node for accessing content in a network, comprising:
a memory storage comprising instructions; and
one or more processors coupled to the memory that execute the instructions to:
receive an interest message including semantics information to be matched to the content in the network, the semantics information excluding a name of the content;
access a memory to identify the content requested in the interest message using the semantics information, the memory including at least one of a content store (CS) caching the content and a forwarding information base (FIB) storing routing entries, the routing entries including content names with corresponding semantics information, forwarding faces and hop count;
aggregate the routing entries in the FIB having the same content name, the semantics information, forwarding faces and hop count to form an aggregated FIB; and
send a FIB propagation message to neighboring network nodes, the FIB propagation message including at least changes made to the existing routing entries in the FIB.

12. The node of claim 11, wherein the one or more processors coupled to the memory further execute the instructions to:
monitor the routing entries in the FIB for changes during a current period;
in response to identifying the changes to the existing routing entries of the FIB, determine whether a routing entry has been added to the FIB;
add the routing entry to the FIB propagation message in the current period in response to determining the routing entry has been changed or added to the FIB;
in response to determining no routing entry has been added to the FIB, determine whether any of the existing routing entries has been deleted from the FIB; and
add the deleted routing entry to the FIB propagation message in the current period in response to determining that one or more of the existing routing entries has been deleted from the FIB.

13. The node of claim 12, wherein the one or more processors coupled to the memory further execute the instructions to:
add a new routing entry into the FIB, including at least a new content name and changes to the FIB propagation message in the current period, in response to no changes being identified in the routing entries of the FIB in the current period; and
add the new routing entry to the routing entries of the FIB to the FIB propagation message in the current period.

14. The node of claim 12, wherein the one or more processors coupled to the memory further execute the instructions to:
determine whether a total number of changes to the routing entries in the FIB propagation message in the current period exceeds the predetermined threshold;
send the FIB propagation message in the current period to the neighboring network nodes in response to determining that the total number has exceeded the predetermined threshold; and
start a new period and maintaining the FIB propagation message from the current period, including the added and deleted routing entries, in response to determining that the total number has not exceeded the predetermined threshold.

15. The node of claim 11, wherein the FIB propagation message includes
an update category indicating a number of updates made to the FIB and a corresponding content name, semantics information and hop count for each of the number of updates, and
a delete category indicating a number of deletes and a corresponding content name for each of the number of deletes.

16. The node of claim 11, wherein the semantics information includes a description of the content and a location of the content.

17. The node of claim 16, wherein
the semantics information further includes a time stamp indicating a time period when the content was generated, and
the timestamp for the aggregated FIB comprises a superset of the time period for each of the routing entries in the FIB having the same content name.

18. The node of claim 16, further comprising:
matching the semantics information in the interest message to the semantics information of the content stored in one of the CS and the FIB, wherein the matching the semantics information satisfies:
the description in the interest message and the description in the content stored in one of the CS and FIB are the same, and
a distance between the location in the interest message and the location of the content stored in one of the CS and FIB is less than a tolerance level defined for the location in the interest message; and
returning the content stored in the CS or using the entry in the FIB towards a producer of the content requested in the interest message in response to finding matching semantics information.

19. A non-transitory computer-readable medium storing computer instructions for accessing content in a network, that when executed by one or more processors, causes the one or more processors to perform the steps of:

receiving an interest message including semantics information to be matched to the content in the network, the semantics information excluding a name of the content;

accessing a memory to identify the content requested in the interest message using the semantics information, the memory including at least one of a content store (CS) caching the content and a forwarding information base (FIB) storing routing entries, the routing entries including content names with corresponding semantics information, forwarding faces and hop count;

aggregating the routing entries in the FIB having the same content name, the semantics information, forwarding faces and hop count to form an aggregated FIB; and sending a FIB propagation message to neighboring network nodes, the FIB propagation message including at least changes made to the existing routing entries in the FIB.

20. The non-transitory computer readable medium of claim 19, wherein the one or more processors further perform the steps of:

monitoring the routing entries in the FIB for changes during a current period;

in response to identifying the changes to the existing routing entries of the FIB, determining whether a routing entry has been added to the FIB;

adding the routing entry to the FIB propagation message in the current period in response to determining the routing entry has been changed or added to the FIB;

in response to determining no routing entry has been added to the FIB, determining whether any of the existing routing entries has been deleted from the FIB; and adding the deleted routing entry to the FIB propagation message in the current period in response to determining that one or more of the existing routing entries has been deleted from the FIB.

21. The non-transitory computer readable medium of claim 20, wherein the one or more processors further perform the steps of:

adding a new routing entry into the FIB, including at least a new content name and changes to the FIB propagation message in the current period, in response to no changes being identified in the routing entries of the FIB in the current period; and adding the new routing entry to the routing entries of the FIB to the FIB propagation message in the current period.

22. The non-transitory computer readable medium of claim 20, wherein the one or more processors to perform the steps of:

determining whether a total number of changes to the routing entries in the FIB propagation message in the current period exceeds the predetermined threshold;

sending the FIB propagation message in the current period to the neighboring network nodes in response to determining that the total number has exceeded the predetermined threshold; and starting a new period and maintaining the FIB propagation message from the current period, including the added and deleted routing entries, in response to determining that the total number has not exceeded the predetermined threshold.

\* \* \* \* \*